United States Patent [19]

Robertson et al.

[11] Patent Number: 5,730,591
[45] Date of Patent: Mar. 24, 1998

[54] METHOD AND APPARATUS FOR AGGREGATE TREATMENT

[75] Inventors: Thomas F. Robertson, Cleveland; Todd A. Miller, Garfield Heights; Dennis E. Quinn, Hinckley, all of Ohio

[73] Assignee: North American Manufacturing Company, Cleveland, Ohio

[21] Appl. No.: 375,471

[22] Filed: Jan. 19, 1995

Related U.S. Application Data

[63] Continuation-in-part of Ser. No. 309,198, Sep. 20, 1994, Pat. No. 5,667,376, which is a continuation-in-part of Ser. No. 44,719, Apr. 12, 1993, Pat. No. 5,407,345.

[51] Int. Cl.[6] .................................................... F27B 7/02
[52] U.S. Cl. ............................ 432/106; 432/72; 34/108
[58] Field of Search .............................. 432/19, 72, 103, 432/106–114, 105; 431/115, 278; 34/499, 549, 551, 108

[56] References Cited

U.S. PATENT DOCUMENTS

| Re. 31,904 | 6/1985  | Mendenhall . | |
|---|---|---|---|
| Re. 31,905 | 6/1985  | Mendenhall . | |
| 3,905,587  | 9/1975  | Freeman . | |
| 4,025,057  | 5/1977  | Shearer . | |
| 4,378,205  | 3/1983  | Anderson | 431/5 |
| 4,496,306  | 1/1985  | Okigami et al. | 431/8 |
| 4,530,657  | 7/1985  | Brashears et al. . | |
| 4,559,009  | 12/1985 | Marino et al. . | |
| 4,600,377  | 7/1986  | Musil . | |
| 4,919,538  | 4/1990  | Swisher . | |
| 4,945,841  | 8/1990  | Nakamachi et al. | 110/341 |
| 4,993,839  | 2/1991  | Brock . | |
| 5,054,931  | 10/1991 | Farnham et al. . | |
| 5,129,334  | 7/1992  | Mize . | |
| 5,154,599  | 10/1992 | Wunning | 431/215 |
| 5,190,454  | 3/1993  | Murray et al. . | |
| 5,192,204  | 3/1993  | Musil . | |
| 5,195,884  | 3/1993  | Schwartz et al. | 431/8 |
| 5,201,650  | 4/1993  | Johnson | 431/9 |
| 5,259,755  | 11/1993 | Irwin et al. | 431/9 |
| 5,263,849  | 11/1993 | Irwin et al. | 431/6 |
| 5,407,345  | 4/1995  | Robertson et al. | 431/115 |
| 5,573,396  | 11/1996 | Swanson | 432/106 |

FOREIGN PATENT DOCUMENTS

| 1 557 574 | 1/1969 | France . |
| 2 012 414 | 7/1979 | United Kingdom . |
| 2 054 822 | 2/1981 | United Kingdom . |
| WO A 92 11983 | 7/1992 | WIPO . |

*Primary Examiner*—William Doerrler
*Attorney, Agent, or Firm*—Jones, Day, Reavis & Pogue

[57] ABSTRACT

A treatment system and method is disclosed for heat treating aggregate, for example, an aggregate dryer of the type which uses a burner and rotating drum for veiling aggregate into a thermal flow path. The invention provides a plurality of mixers which safely mix fuel and oxidant into a premix which is delivered to a reaction chamber. The premix is combusted and recirculated within the reaction chamber to insure uniform and complete combustion, resulting in lower emissions of pollutants such as carbon monoxide, volatile organic compounds, and nitrogen oxides and also lower combustion roar. This uniform and complete combustion results in a more uniform thermal profile within the rotating drum, resulting a greater throughput of processed aggregate and a more efficient consumption of energy. The invention also includes a "tunability" feature for varying the delivery of fuel to the burner in order to avoid resonant vibration produced by a matching of the combustion frequencies with the natural frequency of the treatment system.

14 Claims, 6 Drawing Sheets

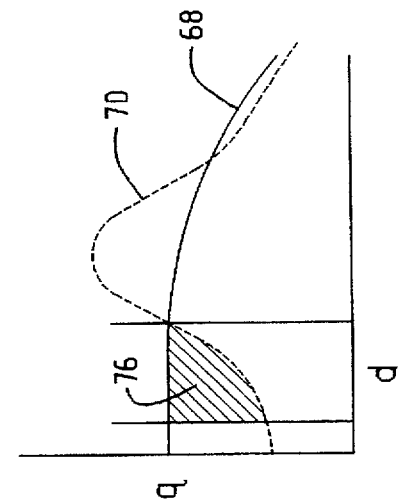
FIG. 8
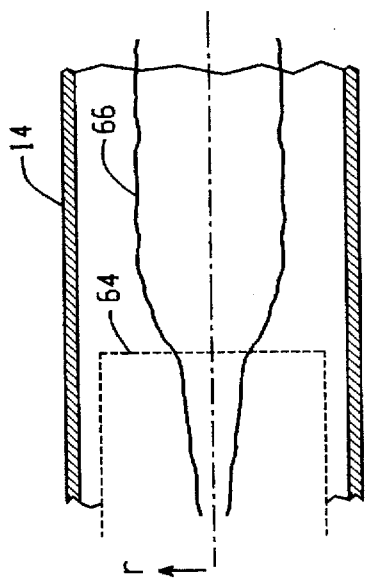
FIG. 7
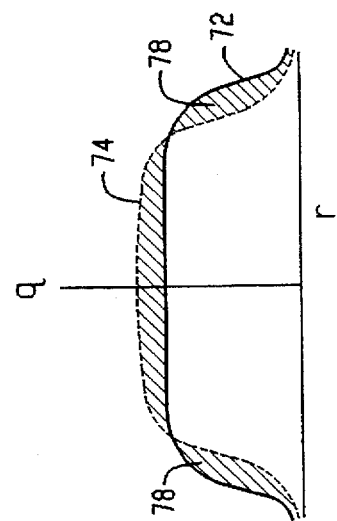
FIG. 9C
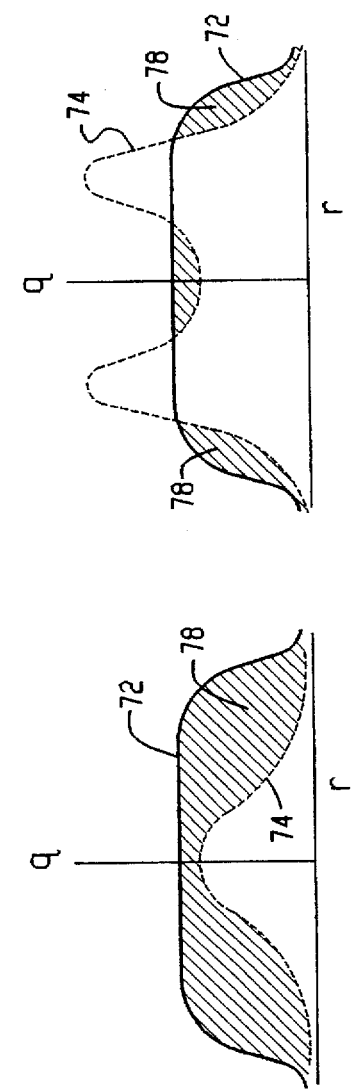
FIG. 9B
FIG. 9A

METHOD AND APPARATUS FOR AGGREGATE TREATMENT

CROSS REFERENCES TO RELATED APPLICATIONS

The present application is a continuation-in-part of U.S. Ser. No. 08/309,198 filed Sep. 20, 1994, now U.S. Pat. No. 5,667,367 which is itself a continuation-in-part of U.S. Ser. No. 08/044,719 filed Apr. 12, 1993 which is now U.S. Pat. No. 5,407,345.

BACKGROUND OF THE INVENTION

The present invention pertains to the field of drying systems, particularly those of the type used for removing a contaminant such as moisture from an aggregate. The present inventon has particular applicability to rotary dryers such as those used for asphalt aggregate and also for calciners or the removal of contaminants as used in soil remediation.

In the manufacture of asphalt, it is important to remove moisture from the aggregate in order to insure a grade of product which is satisfactory for paving applications. The aggregate components which compose asphalt are typically kept out of doors on site at asphalt plants. Thus, these components are exposed to the elements, including conditions of humidity and atmospheric precipitation. As such, it is essential that any moisture which may be retained by these aggregates be removed prior to the processing and application of the asphalt.

In order to remove such undesirable moisture, asphalt plants employ a dryer assembly 10, as shown in FIG. 1. The dryer includes a burner 12 which directs heat into a rotating drum 14, such a drum being of the type known in the art. The aggregate 16 is fed into the drum 14 by an input conveyor 18, which receives aggregate of different sizes from a plurality of hoppers 20, 22, 24. The drum 14 is sloped at a shallow angle so as to permit the aggregate 16 to be gravitationally fed by the motion of the drum 14.

As is best seen in FIGS. 2 and 3, the interior of the drum 14 is typically fitted with flights 26, which extend along the axial length of the drum 14. As the drum 14 is rotated, the flights 26 carry the aggregate 16 from the bottom to the top of the drum 14, where the aggregate 16 is permitted to fall through the thermal flow field generated by the burner 12 in order to vaporize moisture. This process is called "veiling". The flights 26 are typically shaped to permit carriage of the aggregate 16 to the top of the drum 14 so as to produce maximum veiling. The flights 26 thus may have "L" or "J" shaped cross-section. By such veiling, he aggregate 16 is typically heated to a drying temperature of about 275°–325° F.

In one exemplary type of asphalt plan (e.g. a "batch plant" as shown in FIG. 1) the aggregate 16 flows out the bottom of the drum 14 after drying and is placed on an output conveyor 28 which carries the aggregate 16 through steps where it is mixed with asphalt cement so as to form hot mix asphalt, after which it is loaded onto trucks to be transported to the paving site. The dryer assembly 10 may be a "counter-flow" unit (as shown in FIG. 1) where the burner 12 is directed through the drum 14 in the opposite direction from the input of the aggregate 16. However, the dryer assembly 10 may also be a "parallel-flow" unit in which the aggregate 16 is inputted through the drum 14 in the same direction as the burner 12. In order to maintain an effective and economical production rate of asphalt, the burner 12 must fire at 60–200 MBTU's per hour.

The dryer assemblies of the prior art suffer from several drawbacks. As is shown FIG. 3, it is common to fire a burner 12 using a rich fuel/air mixture (30% of the required air for 100% of the supplied fuel wherein the air is supplied by a primary blower 38.) In order to complete the combustion reaction, secondary air 30 is drawn in through an annular aperture 32 by the flow of the burner flame and an induced draft created by an auxiliary fan (not shown). The secondary air 30 mixes with the fuel-rich core 34 only at the edges. In order to create the required air flow, the rich mixture is typically supplied at a pressure of about 30 osi (ounces per square inch). This produces considerable combustion roar (~110 dBA). Asphalt plants are typically located within a 50 mile radius of the paving site, and so these facilities are often located in residential communities where such a level may create a local noise nuisance.

In such prior systems, only about 10% of the fuel is combusted at the point where the burner 12 opens into the drum 14. Since the fuel-rich core 34 mixes with the secondary air 30 only at the edges, the flame becomes very long as the combustion reaction is extended over a greater distance. This creates several specific problems. The rich flame core burns at a relatively cool temperature of about 2400°–2500° F. Also, since the combustion completed a great distance from the burner, thermal distribution within the drum 12 is non-uniform. This uneven distribution results in inefficient consumption of fuel per unit of outputted product since a high temperature differential is not effectively established within the entry of the tube.

In addition to the above, the long flame requires that a longer drum 12 be employed. As the drum 12 is rotated, the aggregate 16 must be precluded from veiling directly into flame. The aggregate 16 is naturally quite a bit cooler than the flame itself. The aggregate 16 cools the flame upon contact, causing "quenching" of the partially combusted products within the flame. Carbon monoxide (CO) is created by this quenching since, as a product of partial combustion, it is "frozen" out of the flame by contact with the cooler aggregate. In addition to CO, other intermediate combustion products are created, namely Volatile Organic Compounds (VOC's). These VOC's include, for example, formaldehyde, ethylene oxide and methanol. Carbon monoxide and VOC's are environmental pollutants which are closely monitored and controlled by federal, state and local agencies. In order to reduce such emissions created by quenching of the flame, the flights 26 must be made shorter than the drum 14 by a distance 36 which corresponds to the reaction envelope of the flame. In this way, the drum must be made sufficiently long to accommodate the flame, thereby increasing the cost of the unit. In spite of this, such prior systems typically release 400–2000 ppmvd (parts per million volume dry) of CO.

The long flame produced by prior dryer assemblies also produces other environmental hazards. Since the secondary air 30 mixes with the rich core 34 only at the edges, a non-uniform mixing occurs which produces local hot spots within the flame. Such hot spots have been identified as sources of nitrogen oxide compounds ($NO_x$) which are environmental pollutants also controlled by government agencies. Such hot spots can be reduced by maintaining uniform control over the fuel-to-air ratio. For this purpose, a secondary blower and control (not shown) are sometimes added to better control the total air supply and hence the fuel-to air ratio. However, the addition of a secondary blower adds additional installation and operating expenses. Even with strict control, prior asphalt plants typically emit about 100 ppmvd of $NO_x$.

In addition to the noise produced by combustion roar, prior systems may also produce resonant noise. It sometimes happens that the frequencies of combustion match the natural frequency of the dryer system, resulting in a deep, low pitched resonant noise produced by the standing wave created in the system. If sufficient damping is not present in the system, this oscillation can increase in amplitude, creating a noise nuisance or resulting in damage to the burner and otherwise producing a potentially undesirable situation.

SUMMARY OF THE INVENTION

In view of the difficulties and drawbacks resulting from the prior systems, it would be advantageous to provide a method and system for aggregate treatment which solves the prior problems while providing greater efficiency and versatility.

Therefore, it is an object of the present invention to provide an aggregate dryer system and method which reduces carbon monoxide and volatile organic compound emissions by reducing the incidence of quenching;

It is another object of the present invention to provide a shorter, more uniformly mixed flame which reduces NOx emissions;

It is an additional object of the invention to provide an aggregate dryer which reduces noise produced by combustion roar;

It is a further object of the present invention to provide a tunable aggregate treatment system and method which reduces resonant noise produced by the dryer system;

It is another further object of the present invention to provide an aggregate treatment system and method which permits more efficient energy consumption, producing greater fuel savings and increased product throughput;

It is also another further object of the present invention to provide a high volumetric heat release from a combustion system and method; and It is still another further object of the present invention to provide a system and method for safely producing a large volume of premix.

These objects and others are realized by the method and apparatus of the present invention wherein fuel and oxidant are mixed in a premix chamber to create a combustible premix which is then admitted into a combustion region. The premix is combusted in this region in order to produce a uniform flame. The flame and combustion products are admitted into a rotating drum containing an aggregate in order to vaporize a contaminant from the aggregate. After the treatment process, the aggregate is removed from the rotating chamber.

In the preferred embodiment, the premix chamber for mixing the fuel and oxidant comprises a plurality of mixers, each including respective fuel and oxidant inlets, wherein the fuel and oxidant are mixed within the mixer's interior volume, in order to safely generate a large volume of premix. The combustion region of the preferred embodiment comprises a reaction chamber which is dimensioned so as to recirculate the premix during combustion in order to insure substantially uniform and complete combustion, thereby producing a high volumetric heat release and reducing partial combustion products such as CO and VOC's, along with reducing NOx emissions.

The present invention may also include a nozzle for supplying additional fuel to the combustion region. The fuel supply can be varied between the nozzle and the premix so as to reduce resonance noise. The control for the fuel supply can vary the fuel supply between these sources so that the equivalence ratio in the combustion region remains constant within the range of about 0.53–0.795.

As will be realized, the invention is capable of other and different embodiments, and its several details are capable of modifications in various respects, all without departing from the invention. Accordingly, the drawing and description are to be regarded as illustrative in nature and not restrictive.

BRIEF DESCRIPTION OF THE DRAWINGS

The preferred embodiments of the invention will now be described by way of example only, with reference to the accompanying figures wherein like members bear like reference numerals and wherein:

FIG. 7 is a sectional view showing the reaction envelope of the burner of the present invention as compared with the reaction envelope of prior burners;

FIG. 8 is a profile which shows the heat distribution over the axial length of rotating drums for prior burners as compared with those of the present invention; and FIGS. 9A, 9B and 9C show profiles of the heat distribution along the drum radius for prior burners as compared with those of the present invention.

DETAILED DESCRIPTION OF THE PREFERRED EMBODIMENT

Figure 1:
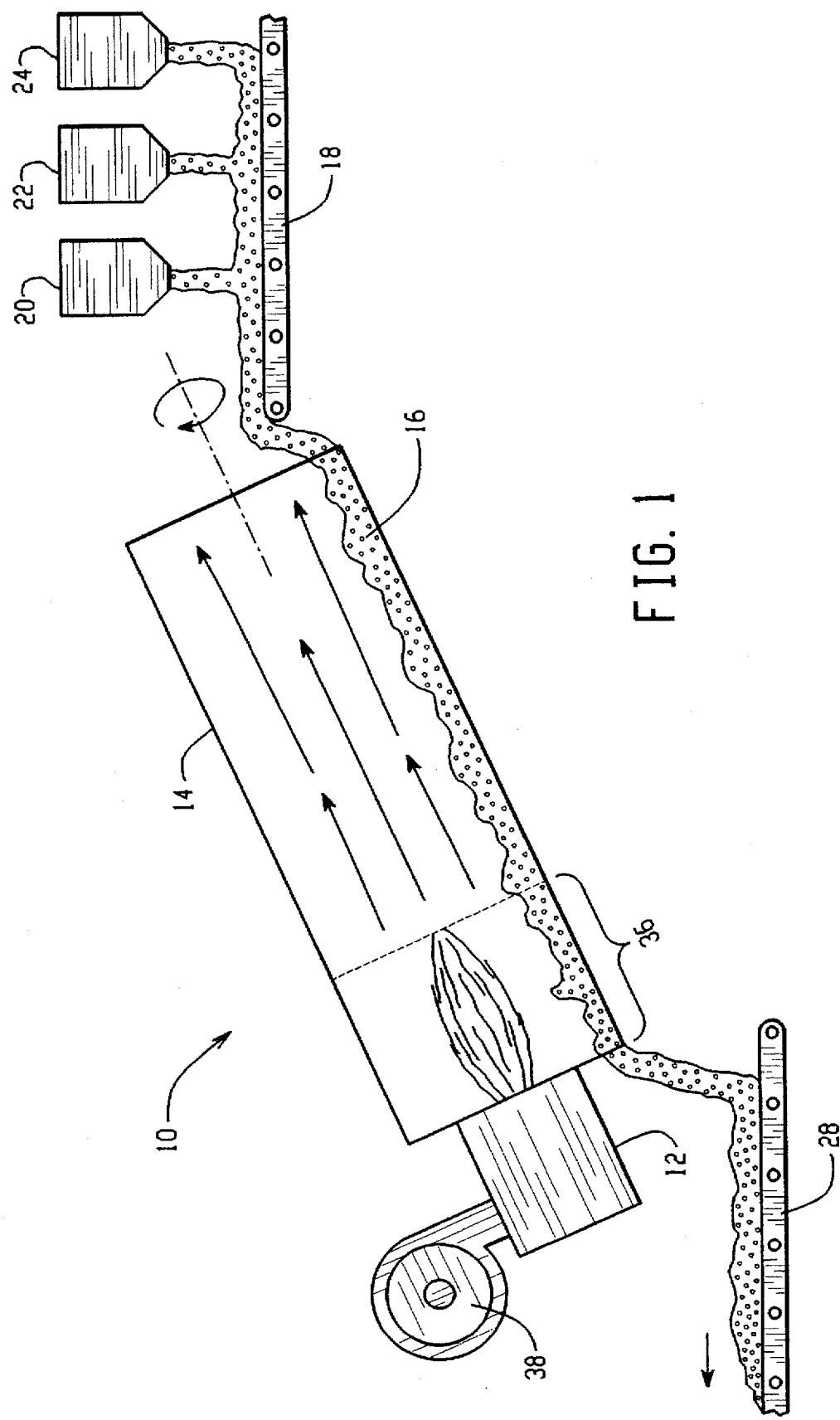
FIG. 1 is a sectional view illustrating the operation of the prior aggregate treatment systems.

Referring now to the drawings which are for purposes of illustrating the preferred embodiment of the present invention only and not for purposes of limiting the same, the figures show a heat treatment system for removing a contaminant from an aggregate, particularly in an asphalt aggregate dryer for removing moisture from an aggregate. However, the present invention may also be used for other similar processes, such as the removal of volatiles for the remediation of contaminated soil.

Figure 5:
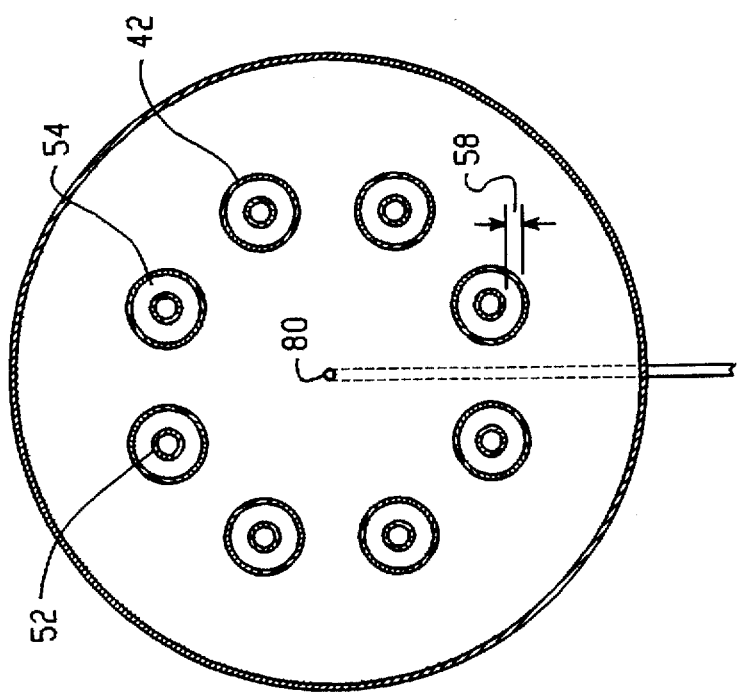
FIG. 5 is a face on view depicting the arrangement of the mixing tubes as according to an embodiment of the present invention.
Figure 2:
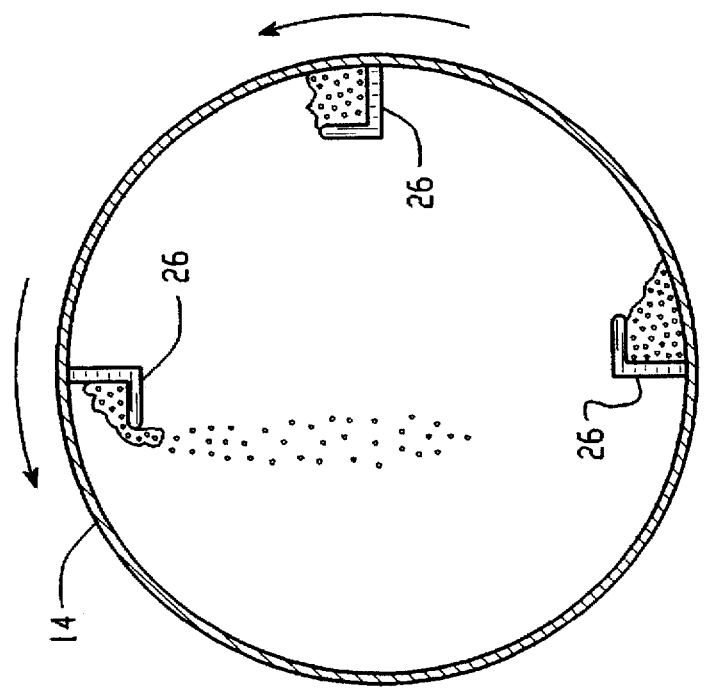
FIG. 2 is a cross-sectional view illustrating the aggregate transport and veiling which results from the rotation of the drum.
Figure 3:
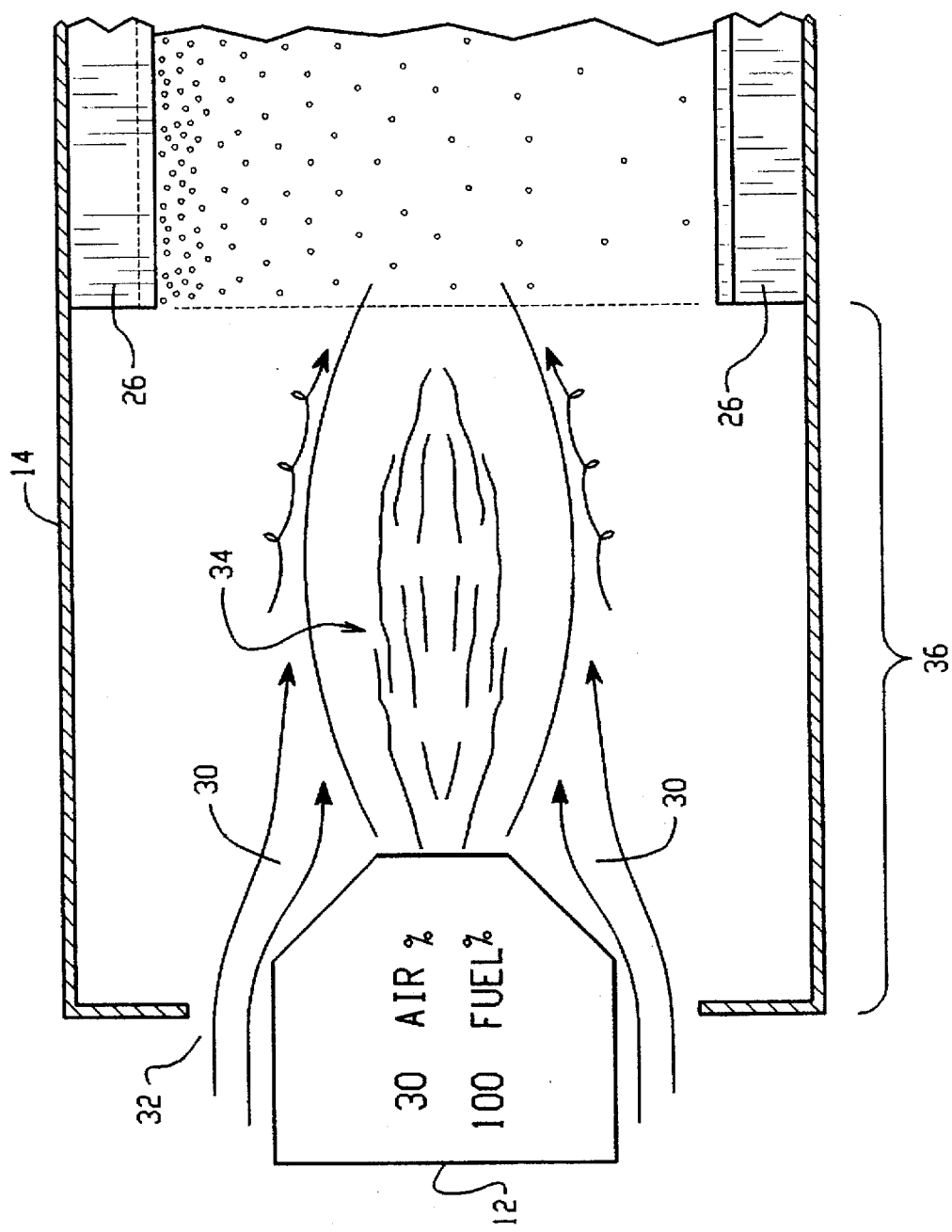
FIG. 3 is a sectional view illustrating the combustion and flow performance of the burner of the prior systems.
Figure 4:
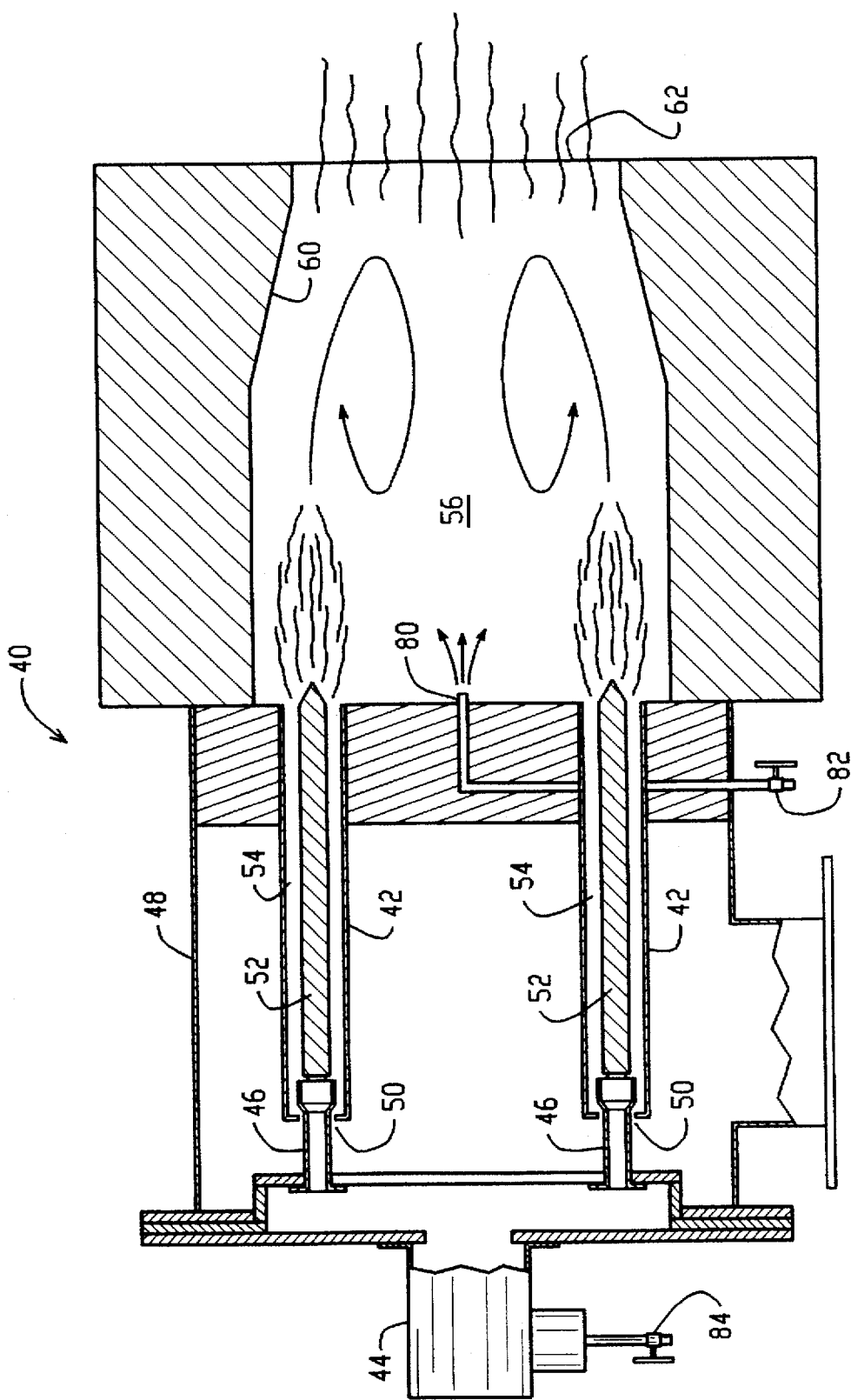
FIG. 4 is a sectional view illustrating the burner as according to the present invention.
Figure 6:
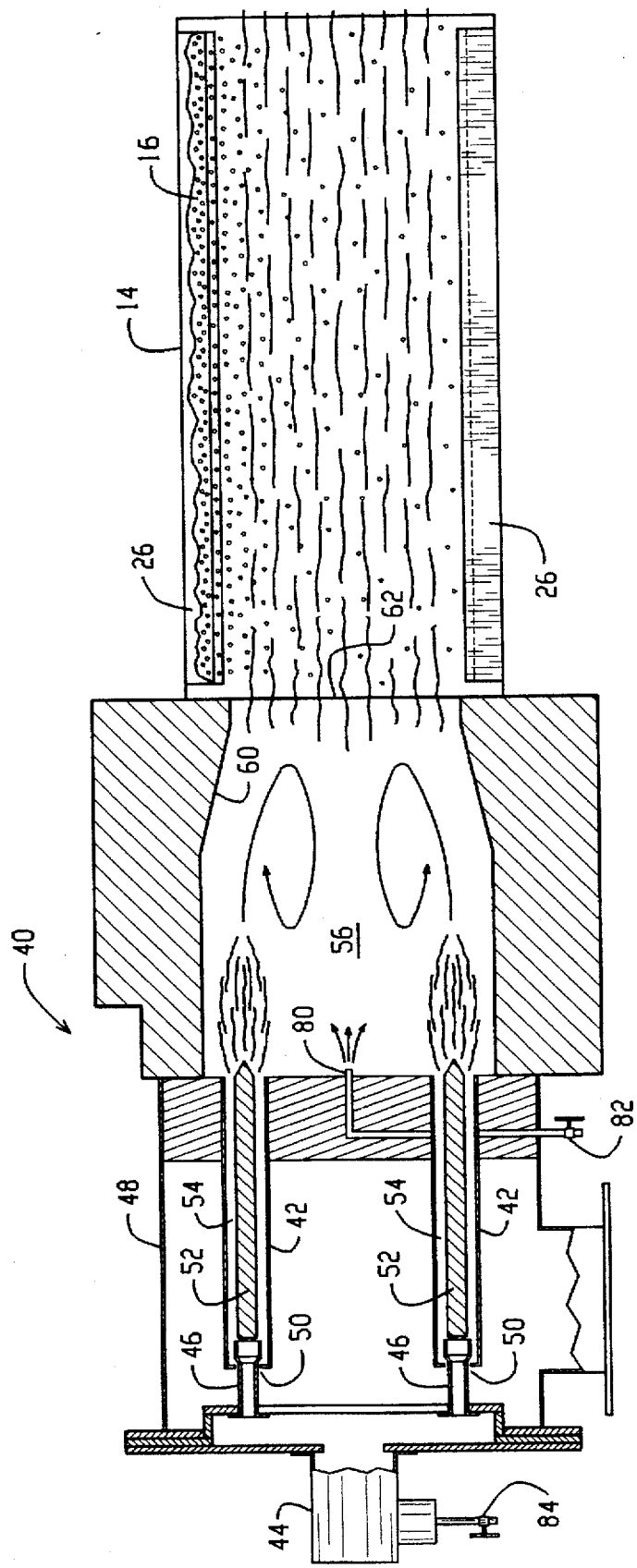
FIG. 6 is a sectional view showing the operation of the burner as used with the rotating drum as according to the present invention.

FIGS. 4–6 illustrate the configuration and operation of the aggregate treatment system as according to the present invention. The burner of the present dryer system is similar to those described in related applications 07/044,719 filed Apr. 12, 1993, now allowed, and 08/309,198 filed Sep. 20, 1994, the disclosures of which are hereby incorporated by reference. The burner 40 of the present invention includes a plurality of mixers, in the preferred embodiment, mixing tubes 42 in which the fuel and oxidant are mixed together to supply a combustible premix. The fuel (preferably natural gas) is supplied through a common fuel plenum 44 which connects each mixing tube 42 through respective fuel inlets 46. Oxidant (preferably air) is supplied through a common oxidant plenum 48 which connects each mixing tube 42 through respective oxidant inlets 50. The fuel and oxidant can be supplied at any pressures such as would occur to the person skilled in the art. In the preferred embodiment, the fuel is supplied at 5 osi and the oxidant is supplied at 6 osi. In the preferred embodiment, the fuel inlet 46 is an aspirator, but for applications where the fuel is supplied at a greater pressure, the fuel inlet 46 can be an inspirator. With either embodiment of the present invention, the air is able to be supplied at a significantly lower pressure than in previous systems, thereby reducing combustion roar.

The cylindrical mixing tubes 42 each include a central obstruction 52 which defines an annular flow passage 54 along a substantial length of the interior of the mixing tube 42. The fuel and oxidant are mixed within this flow passage to create the combustible premix. The mixed fuel and oxidant are discharged into a combustion region defined by a reaction chamber 56 in which the premix is combusted. The flow passages 54 have an effective half-diameter equal to the cross-sectional width 58 of the annular passage 54 (see FIG. 5). In this way, the effective width of the flow passage 54 is made smaller, thus increasing the effective length-to-width ratio (L/D ratio) of the mixer tube 42. In the preferred embodiment, it has been found that an L/D ratio of about 12 is effective at accomplishing complete mixing of the fuel and oxidant. The annular shape increases flow velocity and reduces the passage sizes, thereby reducing the risk of flashback within the flow passage 54, thus permitting the production of significant volumes of premix. In the preferred embodiment, the premix is a lean mixture having an equivalence ratio in the range of about 0.53–0.795.

As is seen from FIG. 5, the plurality of mixing tubes 42 are preferably oriented around the axis of the burner assembly 40 (which is typically collinear with the axis of the rotating drum 14.) Each mixing tube 42 safely generates a significant quantity of premix. However, when the contributions of each tube are added together (e.g. eight tubes, as shown in FIG. 5), prodigious quantities of premix are safely produced, sufficient to safely produce the high volumetric heat release (about 60–200 MBTU's per hour) required for aggregate drying, soil remediation and calcining.

After exiting the mixing tubes 42, the premix is combusted within the reaction chamber 56. The reaction chamber 56 includes a frusto-conical tapered section 60 in which the diameter of this section is tapered toward the axis of the burner 40. The shape of the tapered section 60, in combination with the off-axis location of the mixing tubes 42, creates a flow pattern within the reaction chamber 56 in which hot combustion products are recirculated back toward the combustion site near the opening of the mixing tubes 42. This recirculation promotes a high temperature combustion of the premix very close to the opening of the mixing tubes 42. The recirculation also insures that the products of partial combustion such as CO and VOC's are mostly combusted prior to exiting the burner opening 62. In the burner 40, combustion is completed over a short distance, producing a short, bright flame with a temperature of about 2700° F. Since the burner 40 produces a uniform, well-mixed combustion product, the incidence of local hot spots are reduced, thus greatly reducing the production of $NO_x$. The present invention has been found to produce $NO_x$ at levels below 30 ppmvd, typically 10 ppmvd, as compared with the 100 ppmvd produced by prior systems.

As seen in FIG. 6, the burner 40 of the present invention fires into the rotating drum 14 used for aggregate treatment. Since greater than approximately 80% of combustion may be completed upon exiting the burner 40, quenching of combustion by the aggregate 16 may be greatly reduced.

With the present invention, CO emissions may be reduced to less than 50 ppmvd as compared with 400–2000 ppmvd resulting from prior systems. Consequently, with quenching reduced, the present invention permits either shorter drums 14 to be used, or longer flights 26 which extend closer toward the end of the drum 14. In either case, the drum 14 can be modified to permit more efficient handling of aggregate 16.

FIG. 7 depicts the reaction envelope 64 achievable from the present invention as compared with the reaction envelope 66 typically produced by the prior systems which is directed into the rotating drum 14. The reaction envelope 66 of the prior systems indicates a long, extenuated flame. The fuel and oxidant mixing takes place along the edges of the flame and so peak combustion occurs in an annular region around the central flame along the distance within the drum 14. The flame produced in prior systems also does not extend very far along the radial distance from the axis of the drum 14 toward the drum wall. In comparison, the reaction envelope 64 of the present invention indicates a short, compact flame in which the heat distribution extends further along the radial distance from the drum axis to the drum wall.

The reaction envelope 64 achievable with the present invention results in a thicker layer of triatomic combustion products (carbon dioxide and water vapor), which radiate some of the heat released by combustion, to be directed into the drum 14, since the present reaction envelope 64 extends nearly to the wall of the drum 14. The greater thickness of this radiative layer permits a greater radiative heat transfer to the aggregate 16, according to the well-known thermal relationships. For a burner with an exit opening of between 3–5' as according to the present invention, the radiative layer has a thickness of about 51". Since the reaction envelope 66 of a comparable prior system does not extend very far toward the wall of the drum 14, the radiative layer thickness is only about 12". Thus, with the present invention, the radiative heat transferred to the aggregate 16 (and hence the drying efficiency) is greater than that produced by the prior systems.

The thickness of the radiative layer resulting from the present invention produces a more uniform and efficient thermal distribution within the drum volume than that produced by prior systems, thus increasing the effective zone of radiative heat transfer. As shown in FIG. 8, the radiative heat (q) produced by the present invention 68 is more consistent along the axial distance (d) of the drum 14 than that of the prior systems 70. The difference 76 between these thermal distributions corresponds to the additional amount of heat which is transferred to the aggregate 16 along the length of the drum. Thus, an additional amount of aggregate, proportional to this difference in heat, can be processed by the present invention. Therefore, the present invention produces a higher quantity of dried aggregate product for a drum 14 of a given length.

The present invention also offers greater and more uniform radial efficiency for a given drum 14. As shown in FIGS. 9A, 9B and 9C, prior systems have a thermal distribution 74 that peaks concentrically along the axis of the drum. Due to the lesser thickness of the radiative heat layer, the aggregate 16 has only a narrow zone of hot gas through which it can fall, and so heat transfer is less efficient. The present invention has a theoretical thermal distribution 72 which is more broad, thereby increasing the zone of effective heat transfer during veiling, extending this zone closer to the drum walls. The difference 78 between these thermal distributions is proportional to a more rapid rate of aggregate drying during veiling, thus offering further increased aggregate throughput.

In prior systems, the radial thermal distribution 74 varies greatly along the axial length of the drum. FIG. 9A shows the theoretical thermal distribution 74 of the prior system at a point close to the burner 12, where heat release is low. At a point further down the length of the drum 14 (see FIG. 9B), heat release is greater, but since the greatest combustion occurs in the annular region where mixing takes place (along the edges of the flame), heat release is greatest at nodal points between the axis and the wall of the drum 14. At a point still further down the length of the drum 14 (as seen in FIG. 9C), the radial thermal distribution begins to flatten out as the combustion products become thoroughly mixed. However, the thermal profile 72 of the present invention is uniformly distributed along the radius of the drum 14, providing a more rapid rate of aggregate drying, resulting in increased throughput and improved energy efficiency.

As is clear from the above discussion, the apparatus and method of the present invention offers more efficient consumption of energy, permitting a greater throughput of product in a shorter time. Additionally, the present invention also offers a savings of energy while at the same time lowering emissions of CO and $NO_x$. A summary of the results of the present invention as compared with the prior art is as follows:

| Systems | Present Invention | Prior |
|---|---|---|
| Reaction Completion (at burner outlet) | >80% | ≈10% |
| Flame Temperature (at burner outlet) | 2700° F. | 2400–2500° F. |
| Layer Thickness of Combustion Products | 51" | 12" |
| Air supply Pressure | 5 osi | 30 osi |
| Combustion Roar | <85 dBA | 110 dBA |
| CO ppmvd | <50 ppmvd | 400–2000 |
| $NO_x$ | 10 ppmvd | 100 ppmvd |

The present invention also includes an adjustment feature which reduces the resonant noise produced by the matching of the combustion frequencies with the natural frequency of the dryer system. As is seen in FIGS. 4–6, the burner 40 includes a nozzle 80 which supplies additional fuel to the reaction chamber 56. As additional fuel is supplied through the nozzle 80, the amount of fuel supplied to the mixer tubes 42 through the fuel inlets 46 is reduced so as to produce a leaner mixture exiting the mixer tubes 42, thereby maintaining the equivalence ratio at a constant value within the range of about 0.53–0.795. By varying the amount of fuel delivered respectively through the nozzle 80 and the mixer tubes 42, the combustion frequencies can be altered, thus providing a "tunable" burner which can be "tuned" to a combustion frequency sufficiently different from the natural frequency of the dryer system in order to reduce undesirable resonant vibrations.

Since the present burner 40 can be fitted to accommodate a variety of different drum sizes, the burner 40 must be tunable over a range of frequencies. Fuel supply to the nozzle 80 is varied using a nozzle control 82 (preferably a standard gas valve). As fuel to the nozzle 80 is increased, the fuel to the mixer tubes 42 is decreased using a mixer fuel control 84 (also preferably a standard gas valve) so as to maintain a constant equivalence ratio. Since the natural frequency of the system is a function of geometry and does not change during operation, the burner 40 ordinarily only needs to be manually tuned during installation and so the fuel controls 82, 84 typically need not be varied. In this way, resonance problems typically associated with aggregate treatment systems are precluded by the present invention.

As described hereinabove, the present invention solves many problems associated with the prior aggregate dryer systems, and presents an energy efficient aggregate dryer that offers safe operation and lower pollutant emissions. However, it will be appreciated that various changes in the details, materials and arrangements of parts which have been herein described and illustrated in order to explain the nature of the invention may be made by those skilled in the art within the principle and scope of the invention as expressed in the appended claims.

We claim:

1. A method of treating an aggregate comprising the steps of:
   a) mixing a predetermined proportion of fuel and oxidant in a premix chamber in order to create a combustible premix;
   b) admitting the combustible premix into a combustion region;
   c) combusting said premix within the combustion region;
   d) admitting the combusting premix into a rotating chamber;
   e) introducing an aggregate into the rotating chamber in order to vaporize a contaminant from said aggregate;
   f) flowing the combusted premix out of the rotating chamber; and
   g) removing said aggregate from said rotating chamber.

2. The method of treating an aggregate as in claim 1 wherein the premix chamber comprises a plurality of mixers and wherein the mixing step includes separately introducing fuel and oxidant into each of the plurality of mixers whereby mixing occurs within the interior volume of each mixer in order to safely generate a large volume of premix.

3. The method of treating an aggregate as in claim 2 wherein the fuel and oxidant are admitted into each of the plurality of mixers at respective pressures sufficiently low to suppress combustion roar.

4. The method of treating an aggregate as in claim 1 wherein the combustion region is a reaction chamber and wherein the combusting step includes recirculating premix within the reaction chamber during combustion in order to produce substantially uniform and complete combustion prior to admission into said drum, thereby producing a high volumetric heat release and reducing partial combustion products and NOx emissions.

5. The method of treating an aggregate as in claim 1 wherein additional fuel is supplied to the combustion region and wherein the amount of fuel in the premix and the amount of additional fuel can be varied in order to reduce resonant noise.

6. The method of treating aggregate as in claim 5 wherein the amount of fuel in the premix and the amount of additional fuel are varied such that the equivalence ratio within the reaction chamber remains constant within the range of about 0.53–0.795.

7. The method of treating aggregate as in claim 1 wherein the aggregate is asphalt aggregate and the contaminant to be vaporized is moisture.

8. The method of drying aggregate as in claim 1 wherein the aggregate is soil requiring remediation and the contaminant is an environmental pollutant.

9. An apparatus for treating an aggregate comprising:

a) a premix chamber for mixing a fuel and oxidant to create a combustible premix;

b) a combustion region connected to said premix chamber for combusting said premix in order to produce a flame; and c) a rotating drum, accessible to said combustion region, for receiving and treating the aggregate.

10. The apparatus of claim 9 wherein the premix chamber comprises a plurality of mixers, each mixer including respective fuel and oxidant inlets, wherein fuel and oxidant are mixed within the interior volume of the plurality of mixers in order to safely generate a large volume of premix.

11. The apparatus of claim 9 wherein the combustion region comprises a reaction chamber dimensioned so as to recirculate the premix during combustion in order to insure substantially uniform and complete combustion, thereby producing a high volumetric heat release and reducing partial combustion products and NOx emissions.

12. The apparatus of claim 9 further including a nozzle connected to the combustion region for supplying additional fuel to be combusted.

13. The apparatus of claim 12 wherein the premix chamber includes at least one fuel inlet and wherein the apparatus further includes a fuel supply control for varying the fuel supply between the nozzle and the at least one fuel inlet in order to reduce resonance noise.

14. The apparatus of claim 13 wherein the fuel supply control varies the fuel supply between the nozzle and the at least one fuel inlet respectively so that the equivalence ratio in the combustion region remains constant within the range of about 0.53–0.795.

\* \* \* \* \*